Dec. 15, 1959 L. L. JACKSON 2,917,724

ELECTRICAL JUNCTION BLOCKS

Filed July 26, 1955

INVENTOR.
Lillard L. Jackson

BY Wayland D. Keith

HIS AGENT.

United States Patent Office 2,917,724
Patented Dec. 15, 1959

2,917,724

ELECTRICAL JUNCTION BLOCKS

Lillard L. Jackson, Wichita Falls, Tex.

Application July 26, 1955, Serial No. 524,446

4 Claims. (Cl. 339—198)

This invention relates to improvements in junction blocks, and more particularly to junction blocks wherein the block proper and the circuit bus bars are cast integral within the block and are spaced apart within an insulating material such as plastic, porcelain or the like.

Various junction blocks have been proposed heretofore, but these for the most part were complex to assemble, and were composed of several accessory parts other than the screws, and did not present a junction block which was sealed and insulated in such manner as to preclude danger of electrocution or the enroachment of moisture into the electrical connections, thus making the device usable in damp places.

In the present electrical junction block, the device is so constructed that it may be used within a conduit junction box or it may be used in open work, either with pairs of single wires, or with wires paired together in a common loom. The present disclosure is shown as illustrative of a two wire circuit, however, it is to be understood that the invention can be carried forward into a three-wire circuit by the addition of additional bus bars of the character shown in Figs. 5 and 6.

An object of this invention is to provide an electrical junction block which may be used within a conduit box or on open work wiring, wherein all electrical conductors are completely encased within the block in such manner as to prevent shock.

Another object of the invention is to provide an electrical junction block which presents a one-piece article of manufacture, wherein the electrical circuit bus bars are sealed within an insulating material.

Still another object of the invention is to provide an electrical junction block which has at least two identical bus bars within the junction block, so as to enable the bus bars to be used interchangeably.

Yet another object of the invention is to provide an electrical junction block wherein a multi-circuit may be taken from a single junction block without the necessity of soldering circuit wires.

A still further object of the invention is to provide an electrical junction block wherein an outwardly extending screw-threaded neck is provided to enable the attachment of clamps or conduit fittings directly thereto.

A yet further object of the invention is to provide an electrical junction block with inwardly extending openings to receive wires, which openings fit with wires in substantially fluid tight relation, or which may be sealed therebetween with a plastic sealing element so as to present a fluid tight, sealed electrical connection.

Another object of the invention is to provide an electrical junction block wherein the wires are connected to the various bus bars by means of set screws, which set screws have insulated heads with rubber sealing washers intermediate the block and the head so as to present a fluid tight juncture between the junction block and the respective set screws.

With these objects in mind and others which will manifest themselves as the description proceeds, reference is to be had to the accompanying drawings in which like reference characters designate like parts in the several views thereof, in which.

Figures 1, 2, 3, 4, 5, 6, 7:
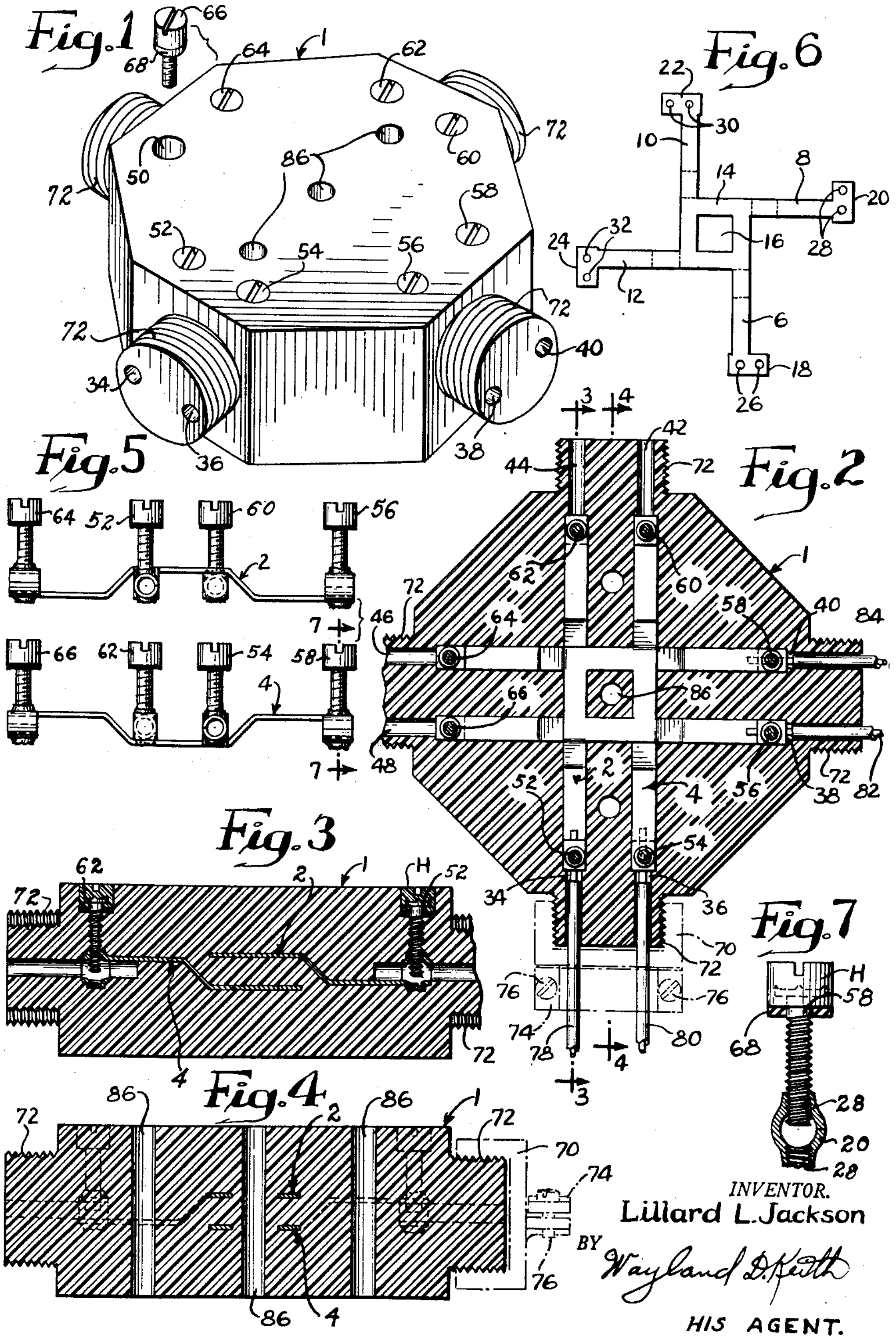
Fig. 1 is a perspective view of the device taken from the top and a side thereof and showing all the set screws in place except one, which is exploded in such manner as to show its relation to the electrical junction block.
Fig. 2 is a transverse, horizontal sectional view taken through the electrical junction block and showing a plan view of the electrical circuit bus bars within the junction block.
Fig. 3 is a sectional view taken on the line 3—3 of Fig. 2, looking in the direction indicated by the arrows.
Fig. 4 is a sectional view taken on the line 4—4 of Fig. 2, looking in the direction indicated by the arrows.
Fig. 5 is an exploded side elevational view of the bus bars only, showing the set screws in place.
Fig. 6 is a top plan view of an electrical circuit bus bar blank before it is formed into the bus bar, which bus bar is molded into the junction block.
Fig. 7 is an enlarged sectional view taken on the line 7—7 of Fig. 5, and showing the set screws in place.

With more detailed reference to the drawing, the numeral 1 designates generally an electrical junction block, which junction block is preferably made of plastic, hard rubber, porcelain or other suitable insulating material that may be molded into a suitable unitary, composite block.

The junction block 1 has electrical bus bars 2 and 4 which are substantially identical in shape, but when reversed and nested, as shown in Figs. 2, 3 and 5, they can be spaced apart in such manner that one will not make electrical contact with the other. The various tongues 6, 8, 10 and 12 are connected to a central member 14 in such manner that a hole 16 is formed within the central member 14. The tongues 6, 8, 10, and 12 which extend outwardly from the central member 14 of the respective bus bars, each has a lug 18, 20, 22 and 24, respectively, thereon. These lugs are pierced to form holes 26, 28, 30 and 32 respectively, therein, so when the blank is rolled to form the bus bar, as shown in Figs. 2, 3, 5, and 7, the holes will be aligned, and since it is preferable to pierce the holes 26, 28, 30 and 32 by means of a sharp pointed die from the inside of the blank before it is rolled into the form as shown in Figs. 5 and 7, an extrusion of the metal is caused, substantially as indicated in Fig. 7, which will enable the tapping of the respective holes transversely, as indicated in Fig. 6, so as to give a substantial threaded area within the respective lugs. Each of the transversely tapped holes is adapted to receive a set screw having an insulated head H, which insulation may be of plastic, hard rubber, or other suitable insulating material.

It is also to be pointed out that the electrical circuit bus bars, designated generally at 2 and 4, are to be supported on pins, within a suitable mold, which pins form the holes 34, 36, 38 and 40, 42, 44, 46 and 48 in the block that is formed within the mold. Other pins are provided in the mold, which pins form holes in the block, such as are indicated at 50, and which holes receive the various set screws 52, 54, 56, 58, 60, 62, 64 and 66. Thus the block 1, with the bus bars 2 and 4, with all the required openings is molded as an integral unit. Rubber washers 68 are provided to be placed beneath the head of each of the set screws 52 through 66, so as to form a sealing gasket between the respective insulated heads, as indicated at H, and the electrical junction block 1, as will best be seen in Figs. 3 and 7.

The pins which form the holes generally designated at 50 are of such size as to enable screw threaded members to pass therethrough and through the respective holes 26–32, inclusive. Figs. 2 and 4 show a conventional clamp 70 which is threadably attached to outwardly extending neck 72, which clamp has clamp bars 74 thereacross, which clamp bars are held in place by means of screws 76. This arrangement makes possible the clamping of wires 78 and 80, when so desired. However, when the respective set screws bindingly engage the bare wire, such as indicated at 78 and 80, 82 or 84, electrical contact between the bus bars 2 and 4 is made with the respective wires. In this manner a pair of "hot wires" may be coupled to any pair of side by side aligned lugs, wherein circuit wires then may be taken from the various lugs by merely attaching wires thereto.

The present block shows contacts for four pairs of wires, which will permit three circuits to be taken therefrom in addition to the "hot circuit" leading into the junction block. However, it is to be pointed out that any desired number of bus bars can be taken from the block, four being shown in the present instance, for purposes of illustration, since this usually conforms to the standard electrical code.

The present electrical junction block is so constructed that it may be used within a conduit outlet box, to meet the electrical codes of some cities, or it may be used without a conduit box, if so desired.

The threaded neck portions 72 may be supplied in such sizes as to fit the conventional conduit screw fittings, both flexible and rigid, or clamps, such as shown at 70, may be threaded thereon, or if used in a conduit box, relatively close fitting necks 72 may be removed by sawing these from the junction block, as the lugs 18, 20, 22 and 24 are spaced inwardly a sufficient amount to admit the wires to protrude into the junction 1 sufficiently to insure a good connection.

Holes 86 are provided through block 1, as will best be seen in Figs. 1, 2 and 4, in such manner as to avoid contact with the electrical circuit bus bars, and through which holes nails or screws may be used to secure the block to the proper joist, studs or to the proper conduit box, as desired.

It is to be stressed, that the present electrical junction block is of unitary construction, with the exception of the set screws, and that it presents an article of manufacture which is impervious to moisture, when properly installed, and which may be used in submerged installations, when properly sealed, as with rubber cement, or other suitable sealing compound, between the respective wires and the sockets within the block, without loss of electrical circuit and without danger from exposed electrical conductors.

While the invention has been illustrated and described in some detail in one form thereof, it is to be understood that modifications may be made as to the number of outlets, or as to the number of conductor wires, or the sets of bus bars within the insulating block may be varied. For instance, a three-wire circuit junction block may be constructed by utilizing two electrical circuit bus bars, substantially as shown in Fig. 6, and a third may be molded within the block wherein the tongues thereof radiate centrally outward perpendicular to central member 14, with the tongues being substantially in a horizontal plane instead of in off-set relation as shown in Fig. 5.

Having thus described the invention, what is claimed is:

1. As a new article of manufacture, a unitary insulating block having faces and sides, a pair of substantially identical, substantially flat multi-tongue electric conductors each of which conductor tongues is off-set laterally in one direction from a tongue extending in the opposite direction, said multi-tongue electric conductors being arranged in opposed, spaced apart relation and wholly embedded in said unitary block, said dielectric block having apertures therein in a transverse plane substantially parallel to at least one face of said block and opening through said block sides, each of said apertures leading from one of said tongues and being adapted to receive an electrical conductor in insulated relation therein, and means including sleeves having longitudinal axes approximately normal to said block sides for securing each of said electrical conductor tongues within said block in electrical contact relation with said electrical conductors passing through the respective apertures.

2. The device as set forth in claim 1 wherein, two conductors fit in complementary relation, the conductors being bent so that said sleeves of both conductors lie in a common plane, and said conductors are in spaced apart relation.

3. An electrical junction block comprising a unitary insulating block, a plurality of electric conductors completely embedded within said unitary block, a first of said conductors having a plurality of tongues that are spaced apart and that are offset from the center part of said first conductor, a second of said conductors having a plurality of tongues that are spaced apart and that are offset from the center part of said second conductor, sleeves at the outer ends of the tongues of said first conductor within which to accept a wire, sleeves on the outer ends of said tongues of said second conductor and adapted to accept wires, said block having faces, means extending through one of said faces and in engagement with said sleeves for fastening the wires in said sleeves, said block having sides with apertures in the sides and passages extending from the apertures in said sides of said block and registered with said sleeves so that electric wires can be passed through said apertures and passages and into said sleeves, necks extending from said body and having at least parts of said passages and said apertures therein, and said sleeves located in said body inwardly of said neck so that said necks can be removed without disturbing said sleeves.

4. The combination of claim 3 wherein there are means on said necks by which to attach a wire-supporting clamp.

References Cited in the file of this patent

UNITED STATES PATENTS

| | | |
|---|---|---|
| 733,697 | Chronik | July 14, 1903 |
| 1,000,101 | Marx | Aug. 8, 1911 |
| 1,915,199 | Park | June 20, 1933 |
| 2,551,423 | De Vito | May 1, 1951 |
| 2,707,203 | Peters | Apr. 26, 1955 |
| 2,727,086 | Madaras | Dec. 13, 1955 |
| 2,824,166 | Madaras et al. | Feb. 18, 1958 |